May 6, 1952 — C. S. PACKER ET AL — 2,595,695
TUBULAR ALUMINUM BAIL WITH REINFORCING INSERTS AT ENDS
Filed Sept. 24, 1947
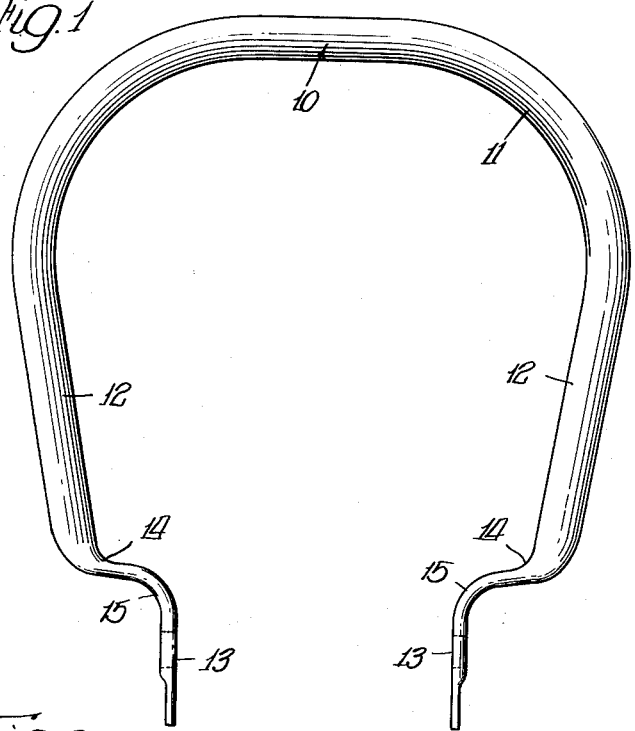
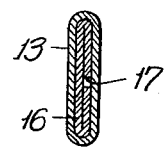
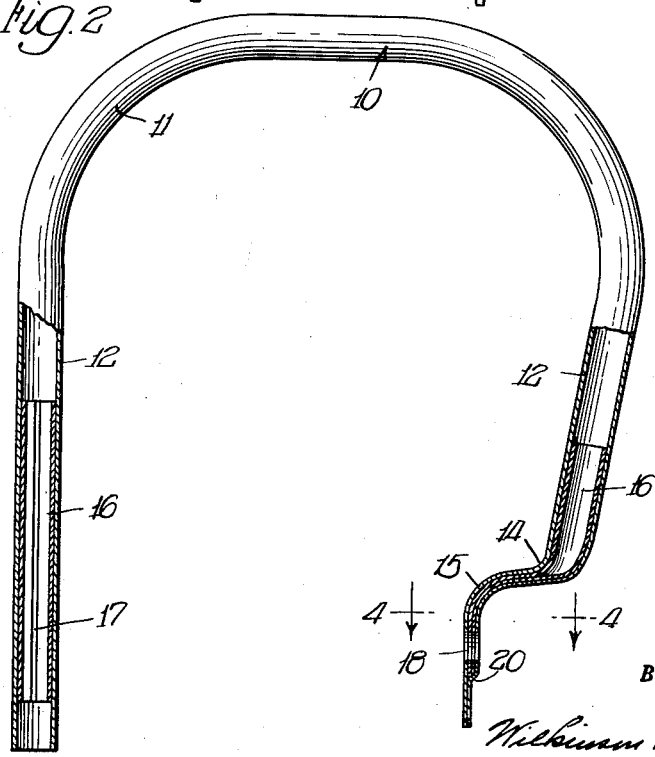
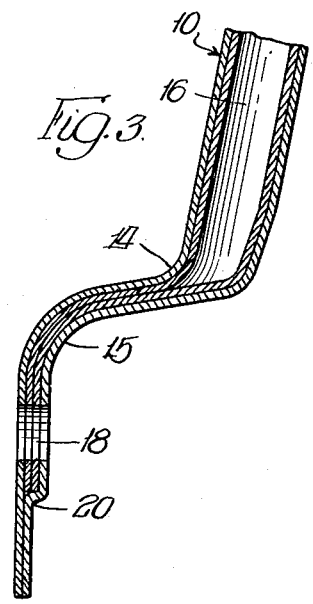
INVENTORS.
Charles S. Packer,
BY Marvin R. Olsen.

Patented May 6, 1952

2,595,695

UNITED STATES PATENT OFFICE 2,595,695

TUBULAR ALUMINUM BAIL WITH REINFORCING INSERTS AT ENDS

Charles S. Packer, Chicago, and Marvin R. Olsen, Glen Ellyn, Ill., assignors to Justrite Manufacturing Company, Chicago, Ill., a corporation of Illinois Application September 24, 1947, Serial No. 775,772

3 Claims. (Cl. 240—52.3)

1

The invention relates to handles for lanterns or the like and has reference more particularly to a reinforced lantern bail which will be economical in construction although providing the desired rigidity and strength required for bails of this type.

An object of the invention is to provide a lantern bail of tubular construction having steel inserts at the respective ends of the bail for reinforcing the locations where the bail is bent.

Another object of the invention is to provide a lantern bail constructed of tubular aluminum and which is reinforced at the respective ends of the bail by steel inserts so that the maximum lightness is obtained with adequate strength despite the double bend formed in each end of the bail structure.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is an elevational view of a lantern bail constructed in accordance with the invention;

Figure 2 is an elevational view of a partly completed bail showing the use of steel inserts for reinforcing the locations where the bail is bent;

Figure 3 is an enlarged fragmentary view of one end of the bail illustrating the improved structure of the invention; and Figure 4 is a sectional view along line 4—4 of Figure 2.

Referring to the drawings, the handle or bail selected for illustrating the present invention is primarily adapted for use with lanterns and particularly the railroad type of lantern used by conductors, brakemen and the like for illumination as well as for signalling purposes. Accordingly, the bail indicated in its entirety by numeral 10 includes a top arcuate portion 11, depending side portions 12 and the offset end portions 13 to which the lantern is pivotally secured.

It has been customary to construct lantern bails of the type as shown in Figure 1 of tubular aluminum. The resulting article has therefore been light in weight which is a desirable feature, but adequate strength has not been secured from the tubular aluminum owing to the double bends

2 at each end of the bail. In the formation of the bail the tubular aluminum is flattened at the initial bend 14 and then the flattened portions are bent at 15 to produce the depending ends 13. These bends constitute local points of weakness in the bail structure and the first breaks in the bail very often occur at these bends since they are subject to severe stresses and strains during use of the lantern.

The lantern bail of the invention is provided with steel inserts 16, an insert being located within the tubular aluminum at each depending end of the bail and extending for the length of the end portion so as to reinforce the bends 14 and 15. In the construction of the bail as shown in Figure 2 the arcuate top portion is formed first and then an insert 16 of steel or other suitable material is located within each depending end. The inserts are cylindrical in shape and may be continuous in peripheral extent or discontinuous, having a longitudinally extending gap such as 17, Figure 2. By the provision of the gap the inserts have a certain resiliency and their insertion within the ends of the bail is facilitated since otherwise machining to accurate diameters is required. With the inserts in place the bends 14 and 15 in each end of the bail are formed by the usual bending procedures. It will be observed that at the initial bend 14 the tubular aluminum of the bail and also the metal of the insert are flattened to bring the walls of the several parts into contacting relation. Whereas this bend was heretofore a point of weakness, the same has now been adequately strengthened and reinforced by the steel insert. The second bend 15 is likewise reinforced by the insert which extends throughout this formation and depends for a distance into the end portion 13 of the bail.

For securing the bail to the lantern the end portions 13 are apertured as at 18. The invention contemplates that the steel inserts will extend into the end portions 13 for some distance beyond the apertures 18 although it is entirely optional whether the inserts terminate short of the end of the bail or extend to the very end. One factor to be considered is the question of rust since the inserts, if of steel, will rust, whereas, the bail proper, being constructed of aluminum, is not subject to rusting. The structure, as clearly shown in Figure 3 has been found satisfactory, wherein the apertures 18 extend through four layers of metal. As a result of the securing means on the lantern for fastening the bail thereto, it is possible to substantially seal the apertures 18 preventing water from reaching the steel insert to thus cause rusting. Also by terminating the steel insert short at the end of the bail, the aluminum of the bail can be peened over as at 20 to effectively seal the end, thus preventing water from entering and reaching the steel insert.

The bail, according to the invention, can be economically manufactured since the steel inserts add very little to the construction costs. In addition a desirable advantage is gained since the resulting bail has adequate strength and rigidity when used with a lantern or the like. Whereas, heretofore the double bend forming the end portions of the bail were local points of weakness and failure of the bail very often occurred at these points, now, however, by reason of the reinforcing and strengthening effect of the steel inserts the end portions are just as strong if not stronger than the remaining portion of the bail. Since the inserts have location within the tubular aluminum they are not visible and the bail appears to be constructed entirely of tubular aluminum.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a lantern bail, a tubular member of aluminum, said member having substantially the shape of an inverted U and including an arcuate handle portion and spaced depending side portions, each side portion having a double bend therein whereby to form an offset terminal end portion, a tubular steel insert located in each depending side portion in the section of the double bends for reinforcing and strengthening the section against the weakening effect of the bends therein, the walls of each side portion and the walls of the insert adjacent thereto being collapsed and flattened as a result of the first bend and said flattened walls continuing throughout the second bend and for the length of each terminal end portion.

2. A lantern bail as defined by claim 1, wherein the terminal end portions each have an opening formed therein and wherein the tubular steel insert of each terminal end portion does not extend for the full length thereof but terminates some distance short of its full length whereby the ends of the bail can be peened to seal the ends against the entrance of water such as would cause rusting and deterioration of the steel inserts.

3. In a lantern bail, a tubular member of aluminum, said member having substantially the shape of an inverted U and including an arcuate handle portion and spaced depending side portions, each side portion having a bend therein whereby to form an offset terminal portion, a tubular steel insert located in each depending side portion in the section of the bend so as to project above and below the same for reinforcing and strengthening the section against the weakening effect of the bend, the walls of each side portion and the walls of the insert adjacent thereto being collapsed and flattened as a result of said bend and said flattened walls continuing for the length of each terminal end portion.

CHARLES S. PACKER.
MARVIN R. OLSEN.

REFERENCES CITED

The following references are of record in the file of this patent:

UNITED STATES PATENTS

| Number | Name | Date |
| --- | --- | --- |
| 1,106,731 | Sargent | Aug. 11, 1914 |
| 1,319,638 | Breckenridge | Oct. 21, 1919 |
| 1,486,840 | Patche | Mar. 11, 1924 |
| 1,602,519 | Brinkmeyer et al. | Oct. 12, 1926 |
| 1,667,706 | Bronson | Apr. 24, 1928 |
| 1,837,808 | Cobb | Dec. 22, 1931 |